United States Patent [19]

Gutjahr

[11] Patent Number: 4,592,712
[45] Date of Patent: Jun. 3, 1986

[54] PLASTIFICATION AND INJECTION DEVICE FOR AN INJECTION MOLDING MACHINE

[75] Inventor: Lothar Gutjahr, Denzlingen, Fed. Rep. of Germany

[73] Assignee: Klöckner-Werke Aktiengesellschaft, Duisburg, Fed. Rep. of Germany

[21] Appl. No.: 734,243

[22] Filed: May 14, 1985

Related U.S. Application Data

[63] Continuation of Ser. No. 463,113, Feb. 2, 1983, abandoned.

[30] Foreign Application Priority Data

Feb. 4, 1982 [DE] Fed. Rep. of Germany ....... 3203763

[51] Int. Cl.⁴ ............................................. B29C 45/54
[52] U.S. Cl. .................................. 425/145; 264/40.3; 425/166; 425/555
[58] Field of Search ............... 264/40.3; 425/135, 145, 425/147, 149, 150, 166, 555; 91/35, 380

[56] References Cited

U.S. PATENT DOCUMENTS

| | | | |
|---|---|---|---|
| 3,590,439 | 7/1971 | Swanson | 137/533.17 |
| 3,797,364 | 3/1974 | Schulze | 91/35 |
| 3,825,235 | 7/1974 | Schwertfeger et al. | 425/145 |
| 3,878,285 | 4/1975 | Souffie | 264/68 |
| 3,888,388 | 6/1975 | Mahoney | 425/145 |
| 3,889,849 | 6/1975 | Chandler, Jr. | 425/145 |
| 3,921,963 | 11/1975 | Neff et al. | 264/68 |
| 3,941,543 | 3/1976 | Hunkar | 425/145 |
| 4,222,725 | 9/1980 | Rodgers, Jr. | 425/145 |
| 4,253,358 | 3/1981 | Schulze | 82/5 |
| 4,511,319 | 4/1985 | Takayama | 264/40.1 |
| 4,540,359 | 9/1985 | Yamazaki | 425/135 |

FOREIGN PATENT DOCUMENTS

2155130 5/1972 Fed. Rep. of Germany .
2533303 2/1977 Fed. Rep. of Germany .
2541733 3/1977 Fed. Rep. of Germany .

OTHER PUBLICATIONS

"Electrohydraulics Linear Amplifiers, Series LVN, LVK, LVH" SIG Swiss Industrial Corporation, Neuhausen Rhine Falls, Switzerland, (Publication I).
"Servotechnik", Hartmann & Lämmle, 11/83, pp. 5-5.09.
SIG-Hydraulischer Linearverstärker, "Type LV", (Publication II).
Electrohydraulic Linear Amplifier LVS, "10th edition, 1977", Hartmann and Lammle KG, (Publication III).

Primary Examiner—Jay H. Woo
Assistant Examiner—J. Fortenberry
Attorney, Agent, or Firm—Watson, Cole, Grindle & Watson

[57] ABSTRACT

A plastification and injection device for an injection molding machine includes a plunger rod on the pressurized piston coupled to a spindle on which the valve body of a directional control valve is guided axially. The spindle is axially rotatable and is coupled to a stepping motor controlled in accordance with the injection pressure and/or the injection rate. The shaft of a hydromotor driving the plastification and injection screw is guided by means of another directional control valve, the valve body of which is guided so as to slide axially on the shaft. And, this shaft is further coupled to another stepping motor. This, upon completion of the plastification process, the direction of rotation of the hydromotor is reversed in order to close the backflow and, because of the interaction of the other stepping motor and the other directional control valve, the screw moves axially by a predetermined amount to close the backflow.

4 Claims, 1 Drawing Figure

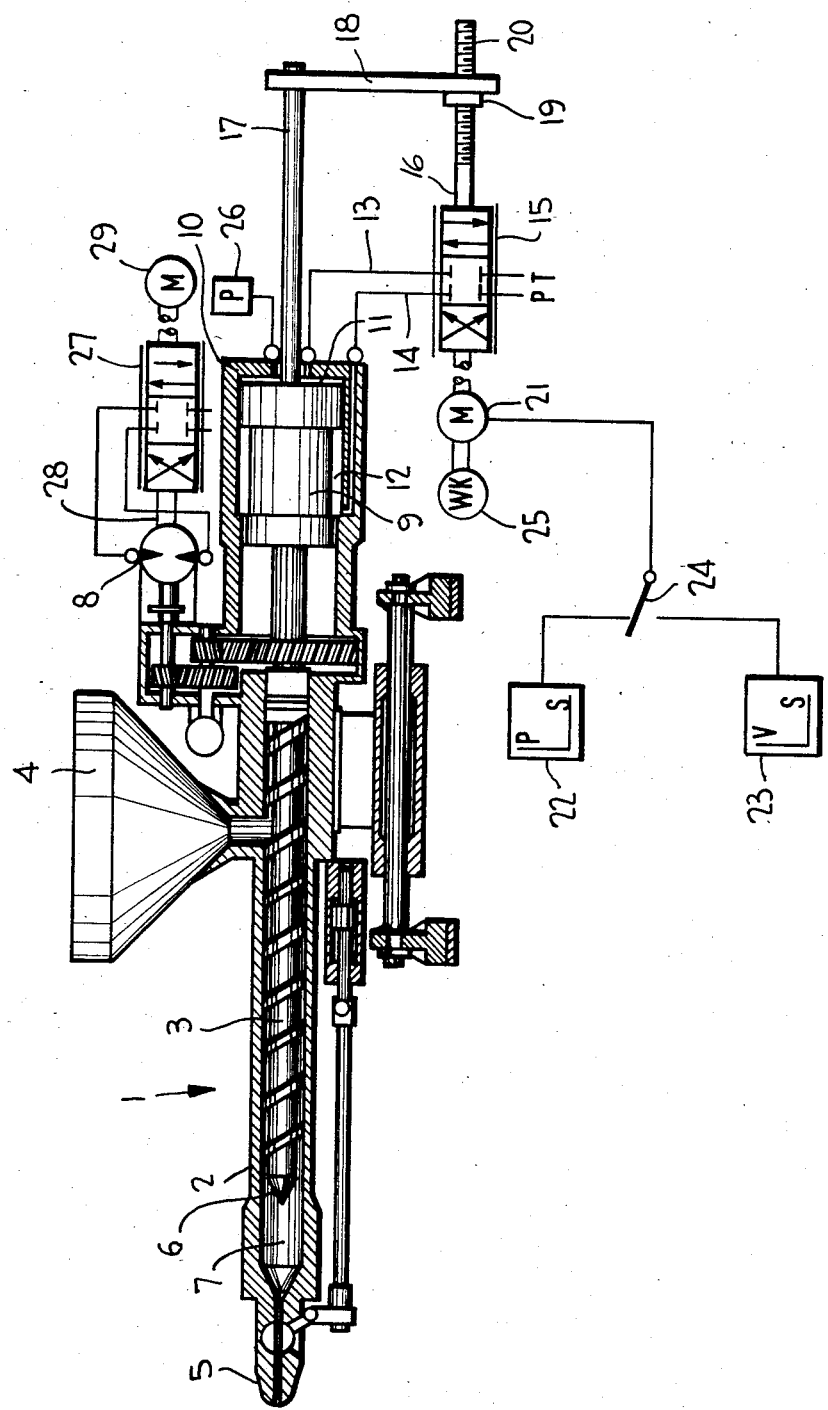

PLASTIFICATION AND INJECTION DEVICE FOR AN INJECTION MOLDING MACHINE

RELATED APPLICATION

This application is a continuation of application Ser. No. 463,113, filed Feb. 2, 1983, and now abandoned.

This application relates to U.S. Ser. No. 463,112, filed Feb. 2, 1983, and based on German application No. P 32 03 810.0-16.

BACKGROUND OF THE INVENTION

This invention relates to a plastification and injection device for an injection molding machine, the device having a drive which, during plastification, causes the extruder screw to rotate about its central axis, and having a pressurized injection piston and cylinder unit controlled by a directional control valve for axially shifting the screw for injecting plasticized material into the machine.

The plastic or plasticized material as herein referred includes thermoplasts, duroplasts, and elastomers/rubber.

The general type of plastification and injection device to which the invention relates, is known in construction and operation. The device usually includes a screw housing having an outlet nozzle and an inlet for plastic material granules, and the plastification and injection screw is mounted within the housing with its tip end spaced from the outlet to define a chamber for the plasticized material. A hydromotor is usually provided for rotating the screw about its central axis for plasticizing the granular material fed into the housing, and a pressurized piston and cylinder unit is provided for axially shifting the screw for injecting the plasticized material into the space between the mating molding parts of the molding machine. During this operation, at the end of the piston suction stroke within the injection cylinder, the pressurized working fluid discharged from the injection cylinder is subjected to a so-called back pressure and, to fabricate the molded article, the injection cylinder is pressurized such that the screw, now operating as a plunger, moves forwardly and at the same time injects plasticized material into the injection mold. After the mold is filled, a holding pressure is applied to take into account the cooling of the molded article which takes place under thermodynamic conditions.

Compensation must be made for the shrinkage of molded articles on cooling. This was heretofore carried out by maintaining a sufficiently high holding pressure, so that through a slight axial displacement of the screw material could be injected into the mold. However, such control mechanisms are usually cumbersome and uneconomical, and it has been found that shrinkage of the mold article can thereby be compensated only incompletely since the operating temperature of the injection molding machine and, thereby, the viscosity of the plasticized material to be injected, fluctuates.

Another known technique in producing accurately sized and error-free mold articles is to minimize the measurement and weight variations of the molded articles so that, during the changeover from injection pressure to holding pressure, discontinuities in the actual pressure variation versus a pre-programmed pressure variation do not occur. Such is disclosed in West German Pat. No. 25 33 303.

As will be seen, the present invention adopts the principle of a hydraulically rigid feedback loop in accordance with the principle of an electro-hydraulic linear amplifier. Hydraulic components operating in accordance with this principle are known from the publication of Hartmann and Lammle KG, "Electrohydraulic Linear Amplifier LVS," 10th edition, 1977. However, these components have heretofore only been employed for the exact positioning of machine components that can slide on machine tools, for example.

And, plastification and injection devices are disclosed in DE-AS No. 25 41 733 and DE-OS No. 21 55 130 in which an axially non-returning is provided within the screw housing between the tip of the screw and the annular space surrounding the screw. The ring forms a back flow stop with the screw together with a retaining ring. The axial movement of the non-return ring is delimited on one side by an adjacent conical shoulder of the screw tip having crown grooves, and on the other by the leading edge of the screw thread. During plastification, the ring bears on the conical shoulder of the screw tip, and the plasticized material flows into the plastification chamber downstream of the screw tip through an annular gap defined between the ring and the conical shoulder as well as through the grooves of the conical shoulder beyond the screw tip. During injection, the non-return ring bears sealingly against the end face of the screw thread and prevents plastified material from flowing back along the lands or ridges of the screw.

When fabricating injection-molded precision articles, extremely small quantities of weight variations are induced, partly because of the fact that when the injection pressure is being applied, the small amounts of plastified material flow back from the area of the screw tip through the open annular gap between the lands or ridges of the screw and the inner wall of the screw housing. Since the viscosity of the plastified material depends, among other things, the temperature, it can be seen that continually fluctuating amounts of material, however small, flow back and deliberately affect the precision parts.

SUMMARY OF THE INVENTION

It is an object of the present invention to provide a plastification and injection device for an injection molding machine, the device having an hydraulic control mechanism such that when molding precision parts adequate compensation is made for shrinkage of the material.

In accordance with the invention, a piston rod on the piston of the pressurized piston and cylinder unit is threadedly coupled with a rotatable spindle which is rotated by a stepping motor coupled therewith in accordance with the injection pressure and/or the rate of injection, and a directional control valve has its valve body mounted on the spindle for axial movement with the spindle upon its rotation to control piston movement.

Thus, the stepping motor rotates the spindle. At the same time, the valve body of the directional control valve is moved correspondingly, thereby allowing a larger or smaller open passage from the pressurized source, so that the piston is correspondingly pressurized and the plunger rod executes an appropriate movement. This, in turn, results in a corresponding movement of the valve body, in an opposite direction, which, in turn, is counteracted by the stepping motor. Thus, a hydraulically strong feedback loop arises, with the result that the movement of the injection piston, as well as the screw, is controlled with any desired degree of precision, which is dependent upon the accuracy of the spindle. This technique makes it possible to switch over, during injection, from a speed-sensitive to a pressure sensitive control as the stepping motor receives the appropriate control demands.

A hydromotor is provided for rotating the injection screw, and another directional control valve is coupled thereto and is operated by another stepping motor which is controlled as function of a given injection pressure/holding variation, or in accordance with a given speed variation of the injection piston or of the screw, for axially rotating the screw in an opposite direction upon completion of the plasticizing process so as to prevent any backflow of the plasticized material from the plasticizing chamber. The valve and the stepping motor which control the axial position of the screw effect a simultaneous axial shifting of the screw upon rotation thereof in such opposite direction.

In accordance with another feature of the invention, the hydraulic control for axially shifting the screw includes a stepping transmitter or coder for sensing the actual values of the distance travelled by the screw or by the piston of the injection cylinder. This transmitter is operatively coupled with the spindle. Therefore, with such arrangement, even after a temporary power failure, the particular position of the screw or of the injection cylinder piston can be determined without having to move the latter to extreme position first in order to redefine the zero position.

A further feature of the invention includes the provision of a pressure sensor for the injection cylinder, which senses the actual values of the pressure. Thus, it is possible to compare the desired value with the actual value of the pressure as a function of the distance travelled, so that with a small device, a feedback loop is provided for the injection and holding pressure.

BRIEF DESCRIPTION OF THE DRAWING

The single drawing FIGURE is a side elevational view, in cross-section, of a plastification and injection device according to the present invention.

DETAILED DESCRIPTION OF THE INVENTION

Turning now to the drawing wherein like reference characters refer to like and corresponding parts throughout the several views, the plastification and injection unit is generally designated 1 and comprises an elongated screw housing 2, and an injection screw 3 mounted within this housing. An inlet 4 is provided on the housing through which granules of plastic material are fed as in any known manner. And, the housing has an outlet nozzle 5 through which the material, when plasticized, is injected into the space between mating molds of an injection molding machine (not shown). Tip end 6 of the screw, in a retracted position, is spaced from the outlet nozzle of the housing so as to define a plasticizing chamber 7.

The screw is rotated about its central axis in a direction which causes the granules of plastic material to be plasticized and fed into chamber 7. Rotation is effected by means of a hydromotor 8 which rotates a gear train operatively coupled with the screw. And, the plastification and injection screw is connected, through a driven gear of the drive train, to a hydraulically operable piston 9 which operates within an injection cylinder 10 extending from the rearward end of screw housing 2. The piston head of the injection piston defines together with the cylinder opposing pressure chambers 11 and 12 respectively interconnected through pressure lines 13 and 14 with a source (not shown) of hydraulic working fluid. A 4/2 directional control valve 15 is provided for pressurizing and venting the chambers when the valve body of this control valve is moved into an appropriate position.

An elongated spindle 16 is threadedly connected with piston 9 by means of a piston rod 17 extending from the piston and a connecting arm 18 mounted on the rod, and an internally threaded collar 19 on the arm being in threaded engagement with an externally threaded portion 20 of the spindle. Otherwise, a toothed bar rod or a toothed belt may be substituted for the spindle, with a suitable mating element provided in lieu of collar 19. The valve body of directional control valve 15 is guided so as to shift together with the spindle within its housing during spindle rotation to thereby control the axial movement of the pressurized piston and the screw.

And, a stepping motor is coupled to the spindle for rotating the spindle in accordance with the injection pressure and/or the rate of injection, to cause axial movement of the piston. This is illustrated schematically by means of a pair of accumulators 22, 23 and a switch 24. Furthermore, an angular coder 25 is coupled to the shaft of motor 21 and indicates the actual value of the path travelled by piston 9. Moreover, pressure chamber 11 is connected to a pressure sensor 26 which indicates the actual value of the injection pressure and of the holding pressure.

The valve body of another multi-directional control valve 27 is arranged to slide on shaft 28 of hydromotor 8 within its valve housing. The shaft extends out through the valve housing of control valve 27 and is coupled to a stepping motor 29. Axial movements of the valve bodies of both directional valves 27 and 15 is carried out according to the principle of an electro-hydraulic linear amplifier of the type disclosed in the aforementioned publication.

It has been found that reverse rotation of the screw on completion of the plastification process and prior to initiation of the injection process, stops backflow of the material and practically reduces it to zero. Thus, stepping motor 29 is controlled in such a manner that backflow is closed upon completion of the plastification process by rotating the screw in an opposite direction and with a simultaneous axial displacement of the screw in a forward direction by an amount which corresponds to the closing path of the backflow. This is detected by the interaction of stepping motor 29 and directional control valve 27.

From the foregoing, it can be seen that screw 3 performs two functions: first, it serves to plasticize the granular material; and second, it serves as a plunger for injecting the mold with the plasticized material from chamber 7. On switching over to the first from the second function, and during injection, care must be exercised to prevent the plasticized material from flowing from chamber 7 along the screw threads or between the annular space surrounding the screw threads. The present invention prevents backflow automatically, quickly and precisely.

Obviously, many modifications and variations of the present invention are made possible in the light of the above teachings. It is therefore to be understood that within the scope of the appended claims the invention may be practiced otherwise than as specifically described.

What is claimed is:

1. A plastification and injection device for an injection molding machine, comprising a screw housing having an inlet for granular plastic material and an outlet nozzle, an injection screw mounted within said housing and having a tip end spaced from said outlet nozzle to therewith define a plasticizing chamber, means for axially rotating said screw in one direction for thereby plasticizing the material fed into said housing, a hydraulic piston and cylinder unit for axially shifting said screw for injecting plasticized material from said chamber through said nozzle, said unit comprising a cylinder affixed to said housing and a piston connected to said screw, said piston defining with said cylinder a piston extension chamber and a piston retraction chamber, hydraulic means for operating said piston and cylinder unit, said means comprising hydraulic feed lines connecting said chambers and a first multi-directional control valve in said lines, a linear amplifier having hydraulically fixed feedback and comprising said valve which is mounted for shifting movement to control the flow of hydraulic fluid through said lines for axially shifting said screw, an elongated threaded rotatable spindle threadedly connected with said piston, said first valve being mounted on said spindle such that the shifting movement thereof is effected upon spindle rotation, a first stepping motor coupled to said spindle for rotation of said spindle in accordance with the injection pressure and/or the rate of injection, whereby rotation of said spindle effects the movement of said first valve to control the flow of hydraulic fluid, the movement of said piston effecting an oppositely directed movement of said first valve via said spindle which is counteracted by said first motor.

2. The device according to claim 1, wherein a stepping transmitter is coupled to said motor for detecting the actual values of the distance travelled by said spindle and said piston coupled thereto.

3. The device according to claim 1, wherein a pressure sensor is mounted on the cylinder of said unit for sensing the actual values of the pressure in said piston extension chamber.

4. The device according to claim 1, further comprising means defining a linear amplifier having hydraulically fixed feedback for effecting axial rotation of said screw in an opposite direction upon completion of the plasticizing of the material so as to prevent any backflow of the plasticized material from said chamber, said means comprising a hydromotor operatively coupled with said screw for rotation thereof in said opposite direction, means for controlling said hydromotor comprising a hydraulic circuit into which said hydromotor is connected, a second multi-direction control valve mounted for shifting movement to control the flow of hydraulic fluid through said circuit for operating said hydromotor, a rotatable shaft extending from said hydromotor on which a second valve is mounted such that shifting movement of said valve is effected upon shaft rotation, a second stepping motor coupled with said shaft for rotation thereof, said second stepping motor being controlled as a function of a given injection pressure/holding variation, or in accordance with a given speed variation of said piston or of said screw, said first stepping motor being controlled to effect simultaneous axial displacement of said screw in a direction for injecting the plasticized material through said nozzle by an amount which corresponds to the closing path of the backflow.

* * * * *